Patented Nov. 21, 1933

1,936,483

UNITED STATES PATENT OFFICE 1,936,483

PROCESS FOR THE MANUFACTURE OF CELLULOSE SOLUTIONS

Emil Scheller, Lorsbach, in Taunis, Germany

No Drawing. Application November 22, 1929, Serial No. 409,195, and in Germany November 26, 1928

14 Claims. (Cl. 260—100)

My invention relates to an improvement in the process for the preparation of solutions of cellulose and refers particularly to solutions which have a well-defined viscosity or the viscosity of which can be regulated according to the purpose for which the solutions are required. This improvement in the process of preparing cellulose solutions consists in either excluding oxygen completely and absolutely whilst preparing the solution or by allowing a certan definite and accurately defined quantity of oxygen to have access to the materials whilst being mixed or dissolved respectively. The oxygen of which I speak may be in the form of pure oxygen or of such oxygen as is contained in the air or in substances containing oxygen in an active form, that is substances giving off oxygen under certain conditions, such as for instance, hydrogen peroxide, salts of persulfuric acid, sodium peroxide or the like. When dissolving cellulose in alkaline solvents such as, for instance, cuprammonia solution or when preparing cellulose xanthogenate solutions, I have made the observation that I could not obtain solutions which always had the same viscosity, but these solutions regularly varied within certain limits. After a long series of experiments and a very close examination of all the conditions prevailing I finally discovered that these viscosity variations were due to the presence of varying amounts of oxygen and that I could obtain solutions of cellulose of a very much greater viscosity and even of a viscosity hitherto unknown, by completely excluding oxygen in every form during the process of solution. In accordance with the present ideas about the maturing process taking place in such cellulose solutions which lean towards the belief that a certain disaggregation takes place during the maturing I am of the opinion that in the solutions obtained by my new process cellulose is present which as not been disaggregated. From the fact that even a very minute quantity of oxygen is able to produce a considerable reduction of the viscosity I have arrived at the conclusion that it is not an oxydation process which takes place and which results in a more or less far reaching disaggregation, but that the oxygen exerts in all probability a catalytic action.

The way in which my new process works may be seen from the following Table I which gives the results of determinations of the viscosity of solutions made in the presence or in the absence of oxygen. The degree of viscosity is given in centipoises (CP.).

*Table I*

| | CP. |
|---|---|
| (1) Solution prepared without application of nitrogen | 3.6 |
| (2) Solution preparted with application of nitrogen from gas cylinders containing 2.4% O | 49.6 |
| (3) Solution prepared with application of nitrogen with 0.7% O | 172.7 |
| (4) Soultion prepared with application of nitrogen free from O | 248.0 |
| (5) Solution prepared the same as before, all the materials well boiled out | 281.4 |
| (6) Same as No. 4, materials boiled for 15 minutes to vacuo | 316.7 |
| (7) Solution prepared like No. 4 with addition of 0.1 gr. CuCl, without boiling | 800.0 |
| (8) The same as No. 7, addition of 0.3 grs. CuCl without boiling | 893.1 |
| (9) Addition of .4 grs. CuCl after boiling in vacuo | 928.4 |

How far the viscosity of a cellulose solution is influenced by the addition of certain well defined amounts of oxygen can be judged from the following table in which I give the results of experiments where I have added varying amounts of a one percent ammonium persulfate in water solution while keeping otherwise the quantities of cellulose and solvent exactly uniform.

*Table II*

| $cc(NH_4)_2S_2O_8$ solution | =Grs. active oxygen | =Percent active oxygen calculated to weight cellulose | Mean of viscosity in CP |
|---|---|---|---|
| 15 | 0.01050 | 1.050 | 6 |
| 10 | 0.00700 | 0.700 | 5.8 |
| 7.5 | 0.00525 | 0.525 | 13.9 |
| 5 | 0.00350 | 0.350 | 266 |
| 2.5 | 0.00175 | 0.175 | 447 |
| 1 | 0.00070 | 0.070 | 629 |
| 0.1 | 0.00007 | 0.007 | 650 |
| 0 | 0.0 | 0 | 731 |

When preparing the cellulose solutions in the absence of oxygen the following precautions have chiefly to be taken, in order to remove the oxygen. The starting material should be freed from oxygen, for instance, by boiling, evacuation, addition of reagents absorbing oxygen, such as ammoniacal cuprous oxide, ammoniacal cuprous chloride or the like; oxygen is removed from the solvent, for instance, by the addition of oxygen absorbing reagents; the reaction vessel in which the mixing is done is kept absolutely free from oxygen, for instance, by washing it with inert gases absolutely free from oxygen.

On the other hand, by adding accurately measured amounts of oxygen I am able to prepare solutions of cellulose of lower viscosity at will. The proper dosing of oxygen may be effected, for instance, by adding definite amounts of compounds containing active oxygen such as salts of persulfuric acid, alkali metal perborates, hydrogen peroxide or the like. Very small quantities of the added compounds are sufficient to obtain the desired results.

It is necessary and essential to avoid access of activating light as much as possible as can be seen from the following experiment: A sample of a solution of cellulose which had been prepared in the dark had a mean viscosity of 894 CP. After exposing the sample for two hours to the direct light of the sun the viscosity of the solution was reduced to 105 CP.

*Examples*

(1) Assume the desideratum to be a solution of cellulose in copper ammoniacal solution containing 1% cellulose and having a viscosity of 5000 CP. First, the viscosity of the starting material, for example, crude cotton or the like, is ascertained when oxygen of the air is absolutely excluded and the solution contains 1% of the cotton. This is effected by mixing one part of the starting material with 1.3 parts of copper hydroxide and 2 parts of cuprous oxide. The air in the vessel is replaced by nitrogen absolutely free from oxygen. Subsequently 75 parts of commercial ammonia solution are added while avoiding the admission of air, and the whole is made up to 100 parts by the addition of water. The mixture is shaken until everything is dissolved. This takes about two hours. The solution is allowed to stand for several hours in order to become homogeneous. It is then passed by means of nitrogen absolutely free from oxygen into a viscosimeter which has been standardized in the well known way by means of a cane sugar solution. During this step, as previously, air is avoided. The value of the viscosity of this 1% cellulose solution is thus ascertained. The mean of several determinations may be, for instance, 14375 CP.

Subsequently, to mixtures prepared in the manner described very small but definite and predetermined quantities of active oxygen in the form of ammonium persulfate in aqueous solution corresponding to, for instance, .005, .01, .05, .1, .2 and .4% active oxygen are added before filling up the various solutions to 100 parts. Thus lower values of viscosity are obtained, for instance, 13994, 12230, 9728, 7093, 3490 and 217 CP. These values are plotted into a curve from which the additional amount of active oxygen necessary for obtaining the desired viscosity of 5000 CP may be extrapolated as .153%. Solutions prepared with this additional amount of active oxygen yield a mean value of viscosity of 4998 CP.

For practical purposes it is possible to prepare from a certain starting material a solution of the desired viscosity in a much simpler way. I can achieve this by systematically omitting one or more steps required for obtaining the greatest possible viscosity, as set out above.

(2) A crude cotton in a 1% solution and when prepared by excluding the air absolutely and completely and measured as described in Example (1), may have a viscosity of 11333. This solution may have been prepared with addition of 1.3 parts of copper hydroxide and 0.2 parts of cuprous oxide. The amount of added cuprous oxide is reduced to 0.05 parts if, at the same time, the amount of copper hydroxide is increased to 1.48 parts, thus keeping the total amount of copper the same. Otherwise the solution is prepared in exactly the same way with the air completely excluded. A cellulose solution results which has a viscosity of 10092 CP.

(3) A crude cotton in solution of 1% prepared with complete exclusion of air and determined as described in Example (1) may have a viscosity of 11333 CP. This solution may have been produced with the addition of 1.3 parts of copper hydroxide and 0.2 parts of cuprous oxide. If the 0.2 parts of cuprous oxide is replaced by a corresponding amount of copper hydroxide, the total amount of copper (1.55 parts of copper hydroxide) thus remaining the same, a cellulose solution is obtained with a viscosity of 1975 CP.

(4) I may proceed according to the method of Example (3) except that the crude cotton utilized, previously to being dissolved is boiled in vacuo for 15 minutes and then whilst still wet dissolved by means of 1.55 parts of copper hydroxide and 75 parts of ammonia solution excluding rigorously access of air. The solution obtained has a viscosity of 2380 CP.

(5) The same crude cotton which when dissolved according to the conditions given in Example (1) produces a solution with a viscosity of 11333 CPP when containing 1% cellulose is dissolved with 1.55 parts of copper hydroxide without addition of cuprous oxide but with application of commercial compressed nitrogen from a cylinder which contains 2.6% of oxygen. A 1% solution might be prepared. The solution obtained has a viscosity, when determined with application of nitrogen completely free from oxygen, of 117 CP.

(6) Assume a commercial sulphite pulp having when in 2% solution as xanthogenate, a viscosity of 733 CP. The solution might have been prepared by a preliminary maturing for 3 days with 8 parts of caustic soda solution of 18%, the addition of carbon sulphide, and filling up with water in the well known way. If all the operations are carried out in an atmosphere of nitrogen absolutely free from oxygen, a cellulose xanthogenate solution is obtained which has a viscosity of 1020 CP.

(7) I may take the same quantities of materials and follow the procedure indicated in Example (6) but, in order to absorb those minute traces of air contained in the pulp, add a small quantity of a substance absorbing oxygen, for instance, pyrogallic acid in the amount of for instance, .5 parts. A cellulose solution is obtained from the same pulp used in Example (3) and which now has a viscosity of 2309 CP.

(8) If the quantity of pyrogallol is reduced to 0.1 part of pyrogallol to each part of pulp, conditions being otherwise those described in Example (1), a cellulose solution with a viscosity of 1408 CP is obtained.

(9) The quantities and the conditions in Example (6) remain the same with the exception that the sulphite pulp is boiled with water for ten minutes in vacuo prior to the alkali treatment. After boiling, the water is squeezed from the pulp as much as possible, then the pulp is subjected to the alkali treatment as described in Example (6). The viscosity of the solution prepared from this pulp is 1082 CP.

My process as I have described it above has the great advantage, compared with other processes for dissolving cellulose hitherto known, that it can be carried through at ordinary temperature. The solutions obtained in this way have a stability which is practically unlimited and they may be used for the production of filaments or the like, especially for the manufacture of artificial silk.

What I claim is:

1. The improvement in the process for the preparation of cellulose solutions which comprises dissolving the cellulose in a suitable solvent selected from the group which consists of cupra ammonium solution and a viscose producing solution such as caustic alkali-carbon disulphide mixtures, in the presence of a definite quantity of oxygen predetermined in accordance with the viscosity desired.

2. The improvement in the process for the preparation of cellulose solutions which consists in dissolving the cellulose in a suitable solvent selected from the group which consists of cupra ammonium solution and a viscose producing solvent such as caustic alkali-carbon disulphide mixtures, there being present during the dissolving operation a predetermined amount of oxygen for the purpose of obtaining a resulting solution of any desired predetermined viscosity.

3. The improvement in the process for the preparation of alkaline solutions which consists in dissolving cellulose in a solvent selected from the group which consists of cupra ammonium solution and a viscose producing solvent such as caustic alkali-carbon disulphide mixtures, and adding to the cellulose-solvent mixture a definite predetermined amount of oxygen during the solution of the cellulose in order to regulate the viscosity of the resulting solution to any definite predetermined value.

4. The improvement in the process for preparing cellulose solutions which comprises freeing the cellulose of uncombined oxygen prior to dissolving the cellulose in a solvent, then dissolving the cellulose in a solvent selected from the group which consists of cupra ammonium solution and viscose producting solvents such as caustic alkali-carbon disulphide mixtures, then adding to the cellulose-solvent mixture a definite predetermined amount of oxygen during the solution of the cellulose in order to reduce the viscosity of the resulting solution to any desired definite predetermined value.

5. The improvement in the process for the preparation of cellulose solutions which consists in mixing cellulose, freed of uncombined oxygen, and a solvent thereof selected from the group which consists of cupra ammonium solutions and viscose producing solvents such as caustic alkali-carbon disulphide mixtures, in a gas atmosphere, and adding a predetermined amount of oxygen to the atmosphere during the mixing operation in order that the viscosity of the resulting solution may be reduced to a definite predetermined value.

6. The improvement in the process for the preparation of cellulose solutions which consists in mixing cellulose, freed of uncombined oxygen, and a solvent thereof, said solvent being selected from the group which consists of cupra ammonium solutions and viscose producing solvents such as caustic alkali-carbon disulphide mixtures, and adding during the mixing operation a definite quantity of a substance containing active oxygen for the purpose of reducing the viscosity of the resulting solution to a definite desired value.

7. The improvement in the process for the preparation of cellulose solutions which consists in mixing cellulose, freed of uncombined oxygen, and a solvent thereof, said solvent being selected from the group which consists of cupra ammonium solutions and viscose producing solvents such as caustic alkali-carbon disulphide mixtures, and adding during the mixing operation a definite amount of a persulphuric acid salt in order that the viscosity of the resulting solution may be reduced to a definte predetermined value.

8. The process of reducing the viscosity of a cellulose solution selected from the group which consists of cupra ammonium cellulose solutions and viscose, which comprises adding oxygen to the cellulose solution until the viscosity of the resulting solution is materially reduced.

9. The process of reducing the viscosity of a cellulose solution selected from the group which consists of cupra ammonium cellulose solutions and viscose, which comprises adding to the cellulose solution an active oxygen containing substance until the viscosity of the cellulose solution is materially reduced.

10. The process of reducing the viscosity of a cellulose solution selected from the group which consists of cupra ammonium cellulose solutions and viscose, which comprises adding to the cellulose solution an amount of an active oxygen containing salt sufficient to reduce the viscosity of said solution to a definite predetermined value.

11. The process of reducing the viscosity of a cellulose solution selected from the group which consists of cupra ammonium cellulose solutions and viscose, which comprises adding oxygen to said cellulose solution until the viscosity of said solution is reduced to a definite predetermined value.

12. The process of reducing the viscosity of a cellulose solution selected from the group which consists of cupra ammonium cellulose solutions and viscose, which comprises adding to said cellulose solutions an amount of a persulphuric acid salt sufficient to reduce the viscosity of said solution to a definite predetermined value.

13. The process of reducing the viscosity of a cellulose solution selected from the group which consists of cupra ammonium cellulose solutions and viscose, which comprises passing into the vessel containing said cellulose solution an amount of a gas containing oxygen for the purpose of materially reducing the viscosity of said cellulose solution.

14. A process for the preparation of viscose and cupra ammonium solutions of predetermined viscosity which comprises adding to such a solution of given composition a quantity of oxygen which is selected in accordance with the results of prior tests and is sufficient to produce a final product having the desired predetermined viscosity.

EMIL SCHELLER.